Patented June 29, 1926.

1,590,792

UNITED STATES PATENT OFFICE.

ROGER ADAMS, OF URBANA, ILLINOIS, EMIL EDWARD DREGER, OF ROCHESTER, NEW YORK, AND ERNEST H. VOLWILER, OF CHICAGO, ILLINOIS, ASSIGNORS TO ABBOTT LABORATORIES, OF CHICAGO, ILLINOIS, A CORPORATION OF ILLINOIS.

ANÆSTHETIC COMPOUND.

No Drawing.   Application filed August 22, 1924.   Serial No. 733,529.

This invention relates to the production of anæsthetic compounds and refers particularly to the production of para amino benzoyl esters of amino alcohols of the general formula:

$$CH_3CHNR_2CH_2OH,$$

where R represents an alkyl group, or an alkyl group containing one double bond such as an allyl group.

This invention has for its object the production of improved compounds possessing valuable anæsthetic properties.

*General method of synthesizing compounds of this series:*

To 1 mol of para nitro benzoyl chloride dissolved in benzene is added 1 mol of the amino alcohol. The mixture is refluxed for one hour whereupon the product separates, usually as an oil. After cooling the mixture, sufficient ether is added to precipitate any dissolved hydrochloride of the condensation product. The ether-benzene solution is decanted and the residue is dissolved in water. The water solution is covered with benzene and sodium carbonate is added to liberate the free base. After extraction with benzene, drying and filtering, dry hydrogen chloride is passed through the benzene solution to precipitate the hydrochloride of the para-nitro benzoyl ester of the amino alcohol.

This product upon reduction by one of the customary methods yields the para amino benzoyl ester of the amino alcohol which possesses marked anæsthetic action both in the form of the free base and the salts thereof.

The amino alcohol esters of the aromatic acid described above, are either liquid compounds or low melting solids insoluble in water but readily soluble in ether, benzene, etc. All of these bases, as well as their salts, possess anæsthetic properties. When heated with an aqueous solution of an alkali they are decomposed to the corresponding amino alcohols and salts of para-amino benzoic acid.

*Specific compounds.*

1. *2-diethyl amino 2-methyl ethanol ester of para amino benzoic acid.*—A specific compound belonging to the general series as above defined is the 2-diethyl amino 2-methyl ethanol ester of para amino benzoic acid. This compound may be prepared by the general process described above, and specifically described as follows:

To 37 gm. of para nitro benzoyl chloride dissolved in 100 cc. benzene is added with stirring 26 gm. of 2-diethyl amino 2-methyl ethanol (which is a liquid boiling at 166–169° at atmospheric pressure, having the specific gravity of 0.8665 at 27°, and an index of refraction of

$n_D^{24}$ 1.4305).

The mixture is refluxed for one hour whereupon the product separates as an oil. After cooling, 50 cc. of ether is added to precipitate any dissolved (2-diethyl amino 2-methyl ethyl) para nitro benzoate hydrochloride. The ether-benzene solution is decanted and the residue is dissolved in water. The water solution is covered with benzene and sodium carbonate is added to liberate the free base. The alkaline solution is extracted twice with benzene, the extract dried and filtered, and dry hydrogen chloride passed through the solution to precipitate (2-diethyl amino 2-methyl ethyl) para nitro benzoate hydrochloride. It again comes down as an oil which solidifies on standing from one to two hours. The product may be recrystallized from absolute alcohol and melts at 155–6°. The free base is a solid melting at room temperature.

The above product is reduced by dissolving one part of it in three parts of concentrated hydrochloric acid, and to the solution, heated to 50–60° C., one part of tin is added. The temperature is kept at 60° C. during the reduction. After freeing the solution from tin by means of $H_2S$, filtering off the tin sulfide and making the solution alkaline, the 2-diethyl amino 2-methyl ethanol ester of para amino benzoic acid separates out. This is extracted and then neutralized with hydrochloric acid. The hydrochloride thus obtained is crystallized from a solvent, such as alcohol, giving white crystals melting at 159–160° C.

2. *2-di-n-butyl amino 2-methyl ethanol ester of para amino benzoic acid.*—Another specific compound belonging to this general series is the 2-di-n-butyl amino 2-methyl ethanol ester of para amino benzoic acid. 2-di-n-butyl amino 2-methyl ethanol is a liquid boiling at 112–114, 10 mm., with a specific gravity .8533 at 20° C., and $$n\frac{18}{D} = 1.4426.$$

It is condensed with para nitro benzoyl chloride as mentioned in example 1, and the product is reduced in a similar manner. The mono hydrochloride of the 2-di-n-butyl amino 2-methyl ethanol ester of para amino benzoic acid is a white crystalline product melting at 200–201°.

*3. 2-diallyl amino 2-methyl ethanol ester of para amino benzoic acid.*—A third product belonging to the above series is the 2-diallyl amino 2-methyl ethanol ester of para amino benzoic acid, which is prepared by a method analogous to that given in Example 1. 2-diallyl amino 2-methyl ethanol is a liquid boiling at 145–147° at 123 mm., specific gravity 0.9103 at 20°, with $$n\frac{20}{D} = 1.4466.$$

The mono-hydrochloride of the 2-diallyl amino 2-methyl ethanol ester of para amino benzoic acid is a white crystalline substance melting at 182–183°.

*4. 2-n-butyl allyl amino 2-methyl ethanol ester of para amino benzoic acid.*—Another example of this general series is the 2-n-butyl allyl amino 2-methyl ethanol ester of para amino benzoic acid which is also prepared substantially by the method given in Example 1. 2-n-butyl allyl amino 2-methyl ethanol is a liquid boiling at 123–125° C. at 30 mm.

The mono hydrochloride of the 2-n-butyl allyl amino β-methyl ethyl alcohol ester of para amino benzoic acid is obtained in the form of an oil.

The scope of the invention is determined by the terms of the appended claims which should be interpreted as broadly as possible consistent with the state of the art.

We claim as our invention:

1. As a new article of manufacture the para amino benzoic acid ester of an amino alcohol having the general formula:

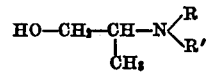

in which R and R' represent alkyl groups or alkyl groups containing a double bond, such as an allyl group.

2. As a new article of manufacture the 2-diethyl amino 2-methyl ethanol ester of para amino benzoic acid having the formula:

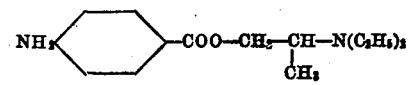

ROGER ADAMS.
ERNEST H. VOLWILER.
EMIL EDWARD DREGER.